Feb. 15, 1938.  L. CORNWELL  2,108,164
HYDRAULIC BRAKING SYSTEM
Filed May 1, 1936  2 Sheets-Sheet 2
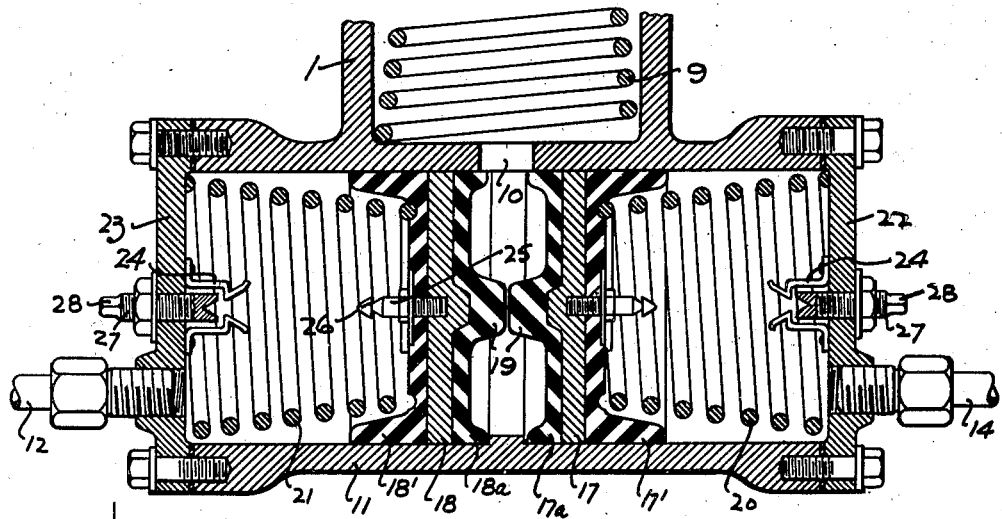
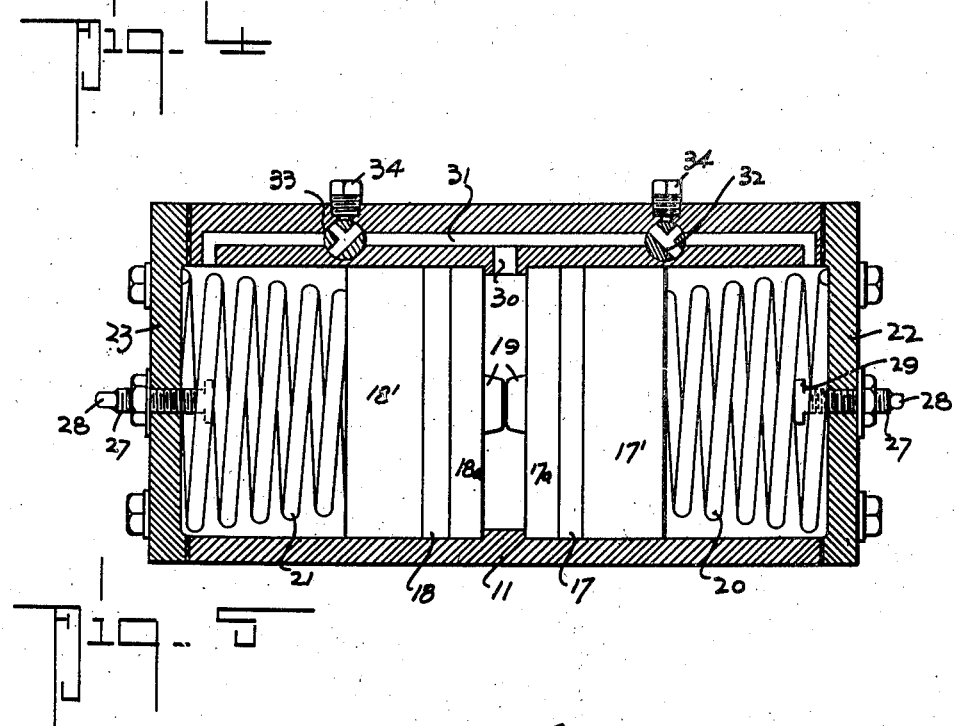
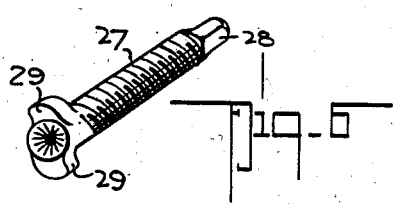
Leroy Cornwell
Inventor
By Herbert E. Smith
Attorney Patented Feb. 15, 1938

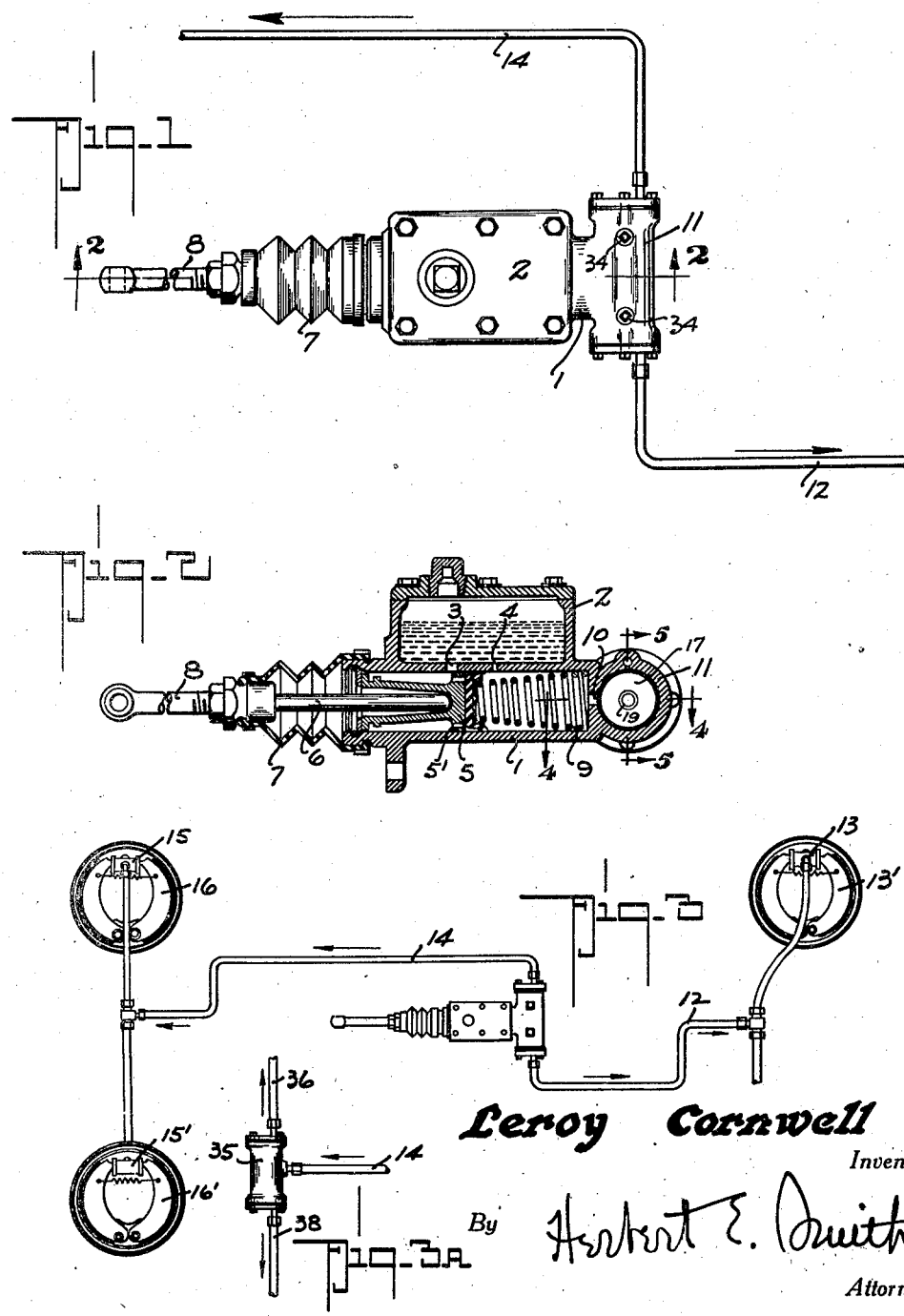

2,108,164

UNITED STATES PATENT OFFICE 2,108,164

HYDRAULIC BRAKING SYSTEM

Leroy Cornwell, Spokane, Wash., assignor of one-half to Paul H. Hull, C. Herman Rodell, and Rollen F. Stewart, Spokane, Wash.

Application May 1, 1936, Serial No. 77,294

1 Claim. (Cl. 303—84)

The present invention relates to improvements in hydraulic braking systems for automotive vehicles, and particularly to an auxiliary safety mechanism incorporated in such systems, by means of which the hydraulic pressure is properly distributed to the brake cylinders when the brakes are applied under normal conditions. In addition to the operation of the auxiliary mechanism under normal conditions, the mechanism of my invention, in combination with a braking system, provides means localizing and reducing to a minimum the loss of oil due to a leak in the system, and in addition the auxiliary operating means also prevents the hydraulic braking system, as a whole, from losing braking-pressure, when a leak occurs in a local part of the system. Means are also provided for restoring oil or motive fluid to the braking system after a leak has occurred.

Thus, should a leak occur in the oil pipe that supplies pressure to the two front brakes, the consequences of such a leak are localized to that pipe, while the pressure is still maintained for the operation of the two rear brakes, and of course the auxiliary operating means serves its purpose when these conditions as to the front and rear brakes are reversed.

In carrying out my invention I combine with the master cylinder and the main brake-pipes, a distributing cylinder or casing in which is enclosed an operating piston, one piston for each of the main pipes of the hydraulic braking system, here shown as two main pipes and two operating pistons, but it will be understood that this number may be increased, if desired or necessary.

The invention consists in certain novel combinations and arrangements of parts as will hereinafter be more fully set forth. In the accompanying drawings I have illustrated one complete example of the physical embodiment of my invention, but it will be understood that changes and alterations may be made in the exemplifying structures, within the scope of my claim, without departing from the principles of my invention.

Figure 1 is a plan view showing the distributing cylinder combined with the master cylinder and reservoir of a hydraulic braking system, and showing also two main oil pipes extending from the distributing cylinder toward the front and rear brake cylinders.

Figure 2 is a vertical longitudinal sectional view at line 2—2 of Figure 1.

Figure 3 is a diagrammatic plan view of the hydraulic braking system according to my invention, and Figure 3a shows a detail of the braking system employed with an automotive trailer.

Figure 4 is an enlarged, horizontal sectional view of the distributing cylinder and operating pistons, as at line 4—4 of Figure 2.

Figure 5 is a vertical, longitudinal, sectional view of the distributing cylinder, with parts in full lines or elevation, as at line 5—5 of Figure 2.

Figure 6 is a perspective view of one of the release bolts for an operating piston in the distributing cylinder.

In order that the utility of the invention, and the general arrangement of parts may readily be understood I have illustrated so much of a well known type of hydraulic braking system as is necessary for my purpose, which system includes the master cylinder 1 and reservoir 2 with the breather port 3 and compensating port 4 affording communication between the interior of the cylinder and the reservoir. The main piston 5 with its ports 5' and stem 6, is reciprocated in the cylinder and pushed to the right in Figure 2 when a brake pedal is depressed as usual. The piston stem projects from the cylinder through a hood 7 and is connected by a flexible joint to the push rod 8 that is connected in suitable manner to the brake pedal, not shown. The main piston is retracted by tension of spring 9, but when pushed to the right in Figure 2 the piston forces oil under pressure from the master cylinder through discharge port 10 into the central portion of the distributing cylinder 11 of my auxiliary mechanism.

As indicated in the drawings the distributing cylinder may be cast integral with the master cylinder, with its longitudinal axis disposed transversely of the longitudinal axis of the master cylinder, and the main oil pipes extend laterally from the ends of the distributing cylinder. The oil pipe 12 extends from the distributing cylinder to the rear brake cylinder 13 for the brakes 13', and the front oil pipe 14 extends to the front brake cylinders 15, 15' of the front brakes 16 and 16'.

Within the distributing cylinder are arranged two floating pistons 17 and 18 each operating between the center of the cylinder and one end thereof, and these pistons are provided with packing rings or glands 17', 17a and 18', 18a to insure a close fit of the pistons in the cylinder. On their adjoining faces the floating, operating pistons are provided with bosses 19, which abut, as in Figure 4, and maintain the pistons in spaced relation to allow flow of oil under pressure from the master cylinder through port 10 to the interior of the distributing cylinder, between the two floating pistons. When the brake pedal is depressed to apply the brakes, the fluid pressure at the central part of the distributing chamber separates the two floating pistons, pushing them outwardly against their return springs 20 and 21 against the two cylinder heads 22 and 23, and the oil in the end portions of the distributing cylinder is thus placed under pressure. It will be understood, of course, that, in addition to the supply of oil at the central part of the distributing cylinder between the floating pistons, the two ends of the distributing cylinder and the brake pipes 12, 14 and brake cylinders 13, 15 are also filled with oil. Thus the pressure of the master-cylinder-oil is extended through the floating pistons to the auxiliary supply of oil in the ends of the distributing cylinder, the brake or oil pipes, and the brake cylinders, and the brakes are applied in usual manner. When the depressed brake pedal is released, the spring 9 returns the main piston, and the springs 20 and 21 return the floating pistons to normal pressure position, and the brakes are released.

Should the brake pressure, as distinguished from the master-cylinder-pressure or pedal-pressure, be reduced, (as by a leak and loss of oil with consequent loss of brake pressure) the greater pedal pressure is instrumental in putting out of commission the affected floating piston that would otherwise supply the brake-pressure. For rendering inoperative either or both of the floating, operating pistons, I provide each head 22 and 23 of the distributing cylinder with a spring catch 24 comprising twin spring hooks fixed to the inner faces of the heads, and the outer face of each of the operating or floating pistons is provided with a central pin 25 having a hook or catch 26. Thus, should an oil leak occur in an oil or brake pipe, and the brake pedal thereafter be depressed, the pedal-pressure will push the corresponding operating piston, against the reduced brake-pressure, until the hook or head 26 engages the spring catch 24, and the floating piston is then held stationary at the end of the distributing cylinder. Through the compensating port, the master cylinder is furnished with additional oil to fill the void created by the displacement of the floating piston, and the pedal pressure is thus maintained in the distributing cylinder. The brake-pressure of the unaffected pipe line is not disturbed nor changed, and therefore, as here illustrated, the brakes of two of the wheels will be operated as long as the pedal is operated.

For releasing the spring latch and thus freeing the affected floating piston, I provide a release bolt 27 in each of the distributing cylinder-heads, which bolts project into the interior of the cylinder between the spring hooks 24 of the latches. These release bolts are provided with an exterior wrench-head 28 and at their inner ends they are each fashioned with a pair of cams 29. When the release bolt is turned by the use of a wrench, the cams spread apart the twin hooks 24, thereby releasing the hook or head 26.

After a leak has been stopped or plugged, the oil supply for the affected brake-line pressure is again replenished, from the reservoir and master cylinder, through a port 30 of the distributing cylinder, which leads into a duct 31 extending longitudinally in the wall of the cylinder with end-ports opening into the opposite ends of the cylinder beyond the range of movement of the two inflating or operating pistons. At each side of the port 30 the duct 31 is provided with a three-way valve as 32 and 33, each of which is secured in closed position by means of a set bolt as 34. If the leak has occurred at the right of the piston 17, for instance, in Figure 5, the valve 32 is turned to afford communication through duct 31 from the port 30, and the required quantity of oil is thus supplied to the distributing cylinder at the right side of valve 32 and into the right end of the distributing cylinder, and of course the replenished oil supply extends through the brake pipe to the brake cylinder. By use of the three-way valve, when opened, air may be vented from the distributing cylinder thus permitting and insuring a full supply of oil from the reservoir 2 through the master cylinder and to the braking system.

In Figure 3a the use of an additional distributing cylinder 35 is indicated, when the braking system is extended to the wheels of a trailer, for instance. This secondary distributing cylinder receives fluid pressure from one of the main pipes, as 14, and thence by pipes 36 and 37 the pressure is transferred to the trailer brakes.

Having thus fully described my invention, what I claim as new and desire to secure by Letters Patent is:—

In a hydraulic braking system, the combination of a distributing cylinder having removable heads and brake-pressure pipes connected thereto, a pair of spaced floating pistons having abutting bosses to provide a central space, an inlet port and an outlet port communicating with said space, said outlet port communicating with a duct in a longitudinal wall of the cylinder and said duct having ports opening into the cylinder adjacent its opposite ends, and a three-way valve in said duct at each side of said outlet port for controlling passage of pressure-fluid therethrough.

LEROY CORNWELL.